United States Patent
Olson et al.

(10) Patent No.: US 11,709,370 B2
(45) Date of Patent: Jul. 25, 2023

(54) PRESENTATION OF AN ENRICHED VIEW OF A PHYSICAL SETTING

(71) Applicant: APPLE INC., Cupertino, CA (US)

(72) Inventors: Earl M. Olson, Santa Clara, CA (US); Nicolai Georg, Sunnyvale, CA (US); Omar R. Khan, Sunnyvale, CA (US); James M. A. Begole, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/048,650

(22) PCT Filed: May 2, 2019

(86) PCT No.: PCT/US2019/030314
§ 371 (c)(1),
(2) Date: Oct. 19, 2020

(87) PCT Pub. No.: WO2019/217182
PCT Pub. Date: Nov. 14, 2019

(65) Prior Publication Data
US 2021/0364809 A1    Nov. 25, 2021

Related U.S. Application Data

(60) Provisional application No. 62/668,368, filed on May 8, 2018.

(51) Int. Cl.
*G02B 27/01* (2006.01)
*G02B 27/00* (2006.01)
(Continued)

(52) U.S. Cl.
CPC ..... *G02B 27/0179* (2013.01); *G02B 27/0093* (2013.01); *G02B 27/017* (2013.01);
(Continued)

(58) Field of Classification Search
CPC ............ G02B 27/0179; G02B 27/0093; G02B 27/017; G02B 2027/0138;
(Continued)

(56) References Cited

U.S. PATENT DOCUMENTS 6,064,354 A    5/2000  DeLuca
6,278,461 B1 *  8/2001  Ellenby .................. G01C 21/20
                                                    348/143
(Continued)

FOREIGN PATENT DOCUMENTS

WO        2013/053876 A2    4/2013

OTHER PUBLICATIONS

PCT, European Patent Office (ISA/EP), International Search Report and Written Opinion of the International Searching Authority, International Application No. PCT/US2019/030314, 13 pages (dated Jun. 21, 2019).

(Continued)

*Primary Examiner* — Ram A Mistry
(74) *Attorney, Agent, or Firm* — Thompson Hine LLP

(57) ABSTRACT

In one implementation, a non-transitory computer-readable storage medium stores program instructions computer-executable on a computer to perform operations. The operations include presenting, on a display of an electronic device, first content representing a standard view of a physical setting depicted in image data generated by an image sensor of the electronic device. While presenting the first content, an interaction with an input device of the electronic device is detected that is indicative of a request to present an enriched view of the physical setting. In accordance with detecting the interaction, second content is formed representing the enriched view of the physical setting by applying an enrichment effect that alters or supplements the image data generated by the image sensor. The second content representing the enriched view of the physical setting is presented on the display.

19 Claims, 8 Drawing Sheets

(51) Int. Cl.
*G06F 3/01* (2006.01)
*G06V 40/16* (2022.01)

(52) U.S. Cl.
CPC ............ *G06F 3/013* (2013.01); *G06V 40/161* (2022.01); *G02B 2027/014* (2013.01); *G02B 2027/0138* (2013.01); *G02B 2027/0187* (2013.01)

(58) Field of Classification Search
CPC ...... G02B 2027/014; G02B 2027/0187; G06F 3/013; G06K 9/00228; G06T 19/003; G06T 19/006; G06T 15/20
See application file for complete search history.

(56) References Cited

U.S. PATENT DOCUMENTS

| | | | |
|---|---|---|---|
| 6,377,277 B1 * | 4/2002 | Yamamoto | A63F 13/5252 345/629 |
| 6,559,813 B1 * | 5/2003 | DeLuca | G06F 3/011 345/8 |
| 6,731,326 B1 | 5/2004 | Bettinardi | |
| 9,304,319 B2 | 4/2016 | Bar-Zeev et al. | |
| 9,443,488 B2 | 9/2016 | Borenstein et al. | |
| 9,677,840 B2 | 6/2017 | Rublowsky et al. | |
| 2010/0118049 A1 * | 5/2010 | Bobrow | G06T 19/00 345/619 |
| 2010/0289899 A1 * | 11/2010 | Hendron | B60R 1/00 348/148 |
| 2012/0249590 A1 | 10/2012 | Maciocci et al. | |
| 2016/0349509 A1 | 12/2016 | Lanier et al. | |
| 2016/0373722 A1 | 12/2016 | Mishra et al. | |
| 2017/0061692 A1 | 3/2017 | Giraldi et al. | |
| 2017/0124764 A1 | 5/2017 | Akselrod et al. | |
| 2017/0200310 A1 | 7/2017 | Kapinos et al. | |

OTHER PUBLICATIONS

China Intellectual Property Office, Office Action, Chinese Patent Application No. 201980030752.3, 7 pages, dated Jan. 6, 2022.
China Intellectual Property Office, Patent Search Report (with English translation), Chinese Patent Application No. 201980030752.3, 6 pages, dated Jan. 6, 2022.

* cited by examiner

PRESENTATION OF AN ENRICHED VIEW OF A PHYSICAL SETTING

CROSS-REFERENCE TO RELATED APPLICATIONS

This application is a national stage filing of International Application No. PCT/US2019/030314 (International Publication No. WO 2019/217182), filed on May 2, 2019, which claims priority to U.S. Provisional Patent Application No. 62/668,368, filed on May 8, 2018. The entire contents of each of these applications is incorporated by reference herein.

TECHNICAL FIELD

The present disclosure generally relates to systems, methods, and devices for presenting views of a setting on a display of an electronic device that is depicted in locally sourced image data, and in particular, to presenting enriched views of the setting by enriching the locally sourced image data.

BACKGROUND

Various electronic devices exist, such as head-mound devices (also known as headsets and HMDs), with displays that present users with views of settings depicted in image data generated by image sensors on the electronic devices. The capabilities of these devices continue to improve with, for example, advancements in processing capacity and communication capabilities. The views and related features presented on these devices, however, often do not adequately and efficiently utilize these capabilities and resources.

SUMMARY

Various implementations disclosed herein include devices, systems, and methods for enriching locally sourced image data. In one implementation, a non-transitory computer-readable storage medium stores program instructions computer-executable on a computer to perform operations. The operations include presenting, on a display of an electronic device, first content representing a standard view of a physical setting depicted in image data generated by an image sensor of the electronic device. While presenting the first content, an interaction with an input device of the electronic device is detected that is indicative of a request to present an enriched view of the physical setting. In accordance with detecting the interaction, second content is formed representing the enriched view of the physical setting by applying an enrichment effect that alters or supplements the image data generated by the image sensor. The second content representing the enriched view of the physical setting is presented on the display.

In another implementation, a system includes an electronic device, at least one processor, and a computer-readable storage medium. The electronic device includes a display, an input device, and an image sensor. The computer-readable storage medium comprises instructions that upon execution by the at least one processor cause the system to perform operations. The operations include presenting, on the display, first content representing a standard view of a physical setting depicted in image data generated by the image sensor. While presenting the first content, an interaction is detected with the input device indicative of a request to present an enriched view of the physical setting. In accordance with detecting the interaction second content is formed representing the enriched view of the physical setting by applying an enrichment effect that alters or supplements the image data generated by the image sensor. The second content representing the enriched view of the physical setting is presented on the display.

In another implementation, a system includes an electronic device, at least one processor, and a computer-readable storage medium. The electronic device includes a display, an input device, and an image sensor. The computer-readable storage medium comprises instructions that upon execution by the at least one processor cause the system to perform operations. The operations include detecting an interaction with the input device indicative of a request to present an enriched view of a physical setting proximate to the electronic device. In accordance with detecting the interaction, content is formed representing the enriched view of the physical setting by applying an enrichment effect that alters or supplements image data obtained using the image sensor. The content representing the enriched view of the physical setting is presented on the display.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
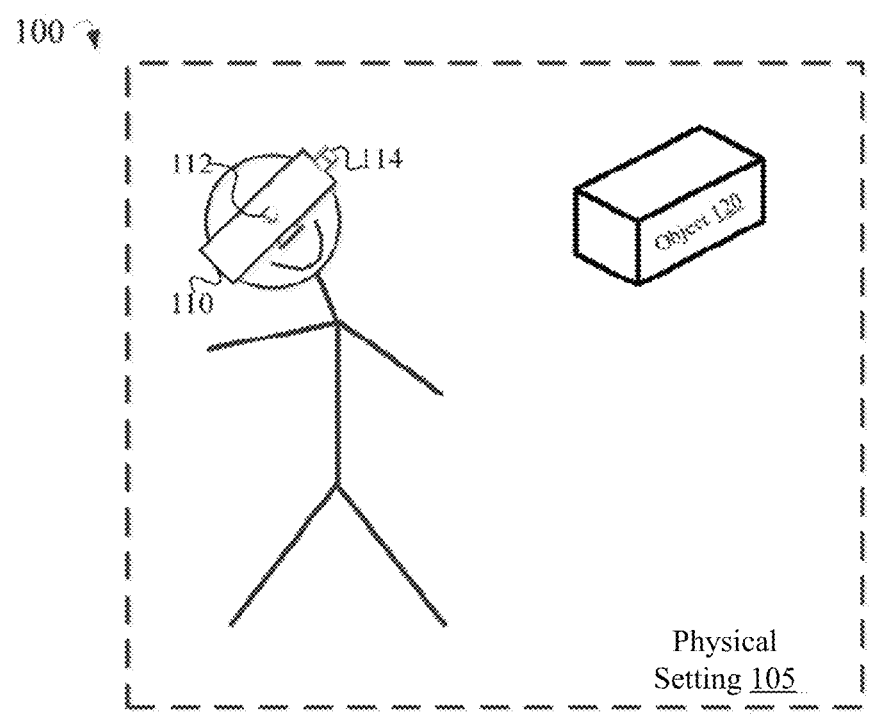
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Referring to FIG. 1, an example operating environment 100 for implementing aspects of the present invention is illustrated and designated generally 100. In general, operating environment 100 illustrates a device 110 configured to present content to a user on a display (e.g., display 208 of FIG. 2). The content may represent a standard view of a physical setting or physical (real-world) environment proximate to device 110 (e.g., physical setting 105) or an enriched view of the physical setting. A "physical setting" refers to a world that individuals can sense or with which individuals can interact without assistance of electronic systems. Physical settings (e.g., a physical forest) include physical objects (e.g., physical trees, physical structures, and physical animals). Individuals can directly interact with or sense the physical setting, such as through touch, sight, smell, hearing, and taste.

In some implementations, the device 110 is configured with a suitable combination of software, firmware, or hardware to manage and coordinate a simulated reality (SR) experience for the user. In some implementations, a controller (not shown) separate from device 110 includes a suitable combination of software, firmware, or hardware to facilitate the SR experience on the device 110. In some implementations, the controller is a computing device that is local or remote relative to the physical setting 105 and in communication with the device 110. In one example, the controller is a local server located within the physical setting 105. In another example, the controller is a remote server located outside of the physical setting 105 (e.g., a cloud server, central server, etc.). In some implementations, the controller is communicatively coupled with the device 110 via one or more wired or wireless communication channels (e.g., BLUETOOTH, IEEE 802.11x, IEEE 802.16x, IEEE 802.3x, etc.).

According to some implementations, the device 110 presents a simulated reality (SR) experience to the user while the user is present within the physical setting 105. In contrast to the physical setting 105, a SR setting refers to an entirely or partly computer-created setting that individuals can sense or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with or sense a SR object using any one of his senses, including touch, smell, sight, taste, and sound. For example, an individual may interact with or sense aural objects that create a multi-dimensional (e.g., three dimensional) or spatial aural setting, or enable aural transparency. Multi-dimensional or spatial aural settings provide an individual with a perception of discrete aural sources in a multi-dimensional space. Aural transparency selectively incorporates sounds from the physical setting, either with or without computer-created audio. In some SR settings, an individual may interact with or sense only aural objects.

One example of SR is virtual reality (VR). A VR setting refers to a simulated setting that is designed only to include computer-created sensory inputs for at least one of the senses. A VR setting includes multiple virtual objects with which an individual may interact or sense. An individual may interact or sense virtual objects in the VR setting through a simulation of a subset of the individual's actions within the computer-created setting, or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation or location with respect to the physical setting to enable interaction between virtual objects and real objects (which are physical objects from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of, but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical object captured by imaging sensor(s). In another example, a virtual object may exhibit characteristics consistent with actual weather conditions in the physical setting, as identified via imaging, weather-related sensors, or online weather data. In yet another example, an augmented reality forest may have virtual trees and structures, but the animals may have features that are accurately reproduced from images taken of physical animals.

Many electronic systems enable an individual to interact with or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) or microphones for taking images/video or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one implementation, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Device 110 may provide SR views of physical setting 105. For example, a view of the physical setting 105 may include an object (e.g., object 120). In one implementation, object 120 is a physical object within physical setting 105. In one implementation, the object is a virtual object comprising virtual image data. Virtual image data may include two-dimensional ("2D") and/or three-dimensional ("3D") graphical/image content, which is generated or at least processed by a computing device. As such, a virtual object is not perceivable by a user without a computing device.

Figure 2:
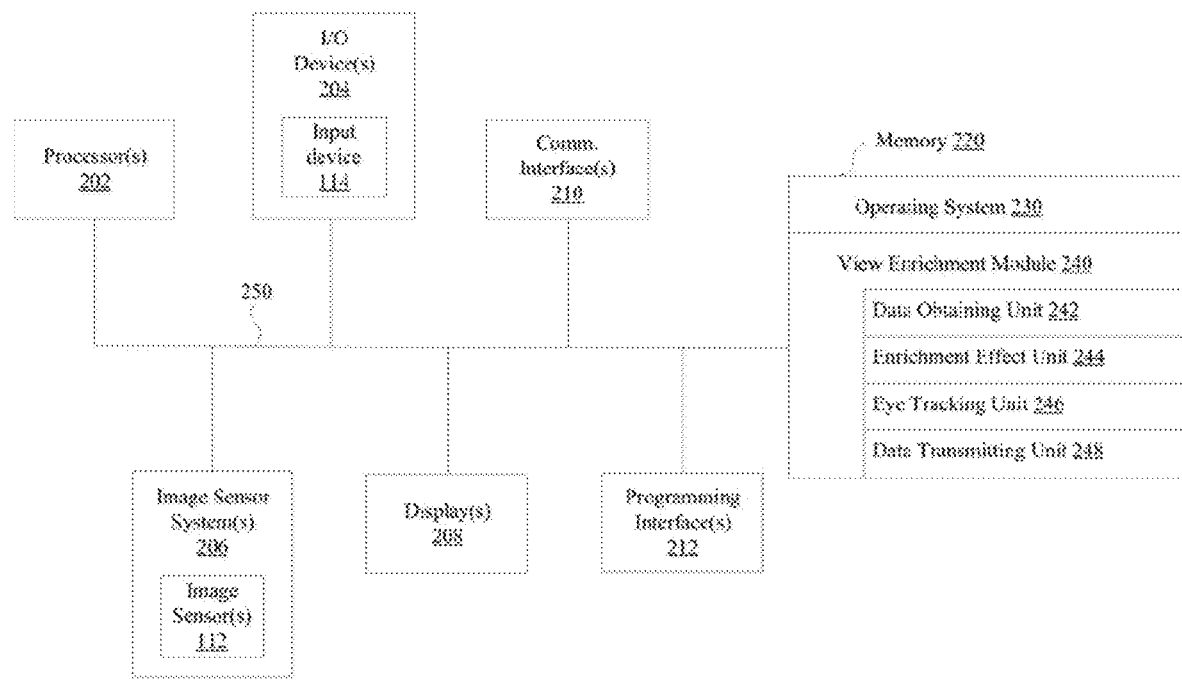
FIG. 2 is a block diagram of an example electronic device that is suitable for implementing aspects of the present disclosure.

In general, a virtual image source is configured to generate virtual image data for presentation (e.g., on display 208 of FIG. 2). In one implementation, a virtual image source includes a computer graphics application (pipeline). Examples of suitable computer graphics applications include vector graphics editors, raster graphics editors, 3D modelers, and the like. In one implementation, a virtual image source is effectuated using computing resources provided by device 110. In one implementation, at least a portion of a virtual image source is effectuated using computing resources provided by a computing device that is external to device 110. In one implementation, a virtual image source receives input via a network interface of device 110 (e.g., communication interface 210 of FIG. 2).

Device 110 is shown as a head-mounted device ("HMD") in the example depicted by FIG. 1. Those skilled in the art will recognize that an HMD is but one form factor that is suitable for implementing device 110. Other form factors that are suitable for implementing device 110 include smartphones, AR glasses, smart glasses, desktop computers, laptops, tablets, computing devices, and the like. In some implementations, device 110 includes a suitable combination of software, firmware, and/or hardware.

For example, device 110 may include image sensor 112, input device 114, and an output device (e.g., display 208 of FIG. 2). Examples of suitable devices for implementing the output device include a display, an audio speaker, a haptic device, and the like. In one implementation, device 110 includes an output device disposed on an inward facing surface of device 110.

Image sensor 112 is configured to obtain image data corresponding to a the physical setting 105 in which device 110 is located. In one implementation, image sensor 112 is part of an array of image sensors configured to capture light field images corresponding to the physical setting 105 in which device 110 is located.

Input device 114 is configured to receive inputs indicative of requests to present an enriched view of a physical setting or physical setting (e.g., physical setting 105) in which electronic device is located. In one implementation, input device 114 is disposed on an outward facing surface of device 110. In one implementation, input device 114 is disposed on an exterior surface of device 110. In one implementation, input device 114 is a rotatable device disposed on an exterior surface of device 110.

In one implementation, input device 114 is further configured to physically detach from device 110. In one implementation, input device 114 is further configured to remain communicatively coupled with a processor of device 110 when physically detached from device 110. In one implementation, input device 114 is communicatively coupled with the processor of device 110 via one or more wired and/or wireless communication channels (e.g., BLUETOOTH, IEEE 802.11x, IEEE 802.16x, IEEE 802.3x, and the like). In one implementation, input device 114 is communicatively coupled with a processor of a computing device external to device 110 via one or more wired and/or wireless communication channels. In one implementation, the computing device external to device 110 is a local server (e.g., a video game console) within physical setting 105, a remote server (e.g., a cloud server, an application server, a central server, and the like) external to physical setting 105, or a combination thereof.

In one implementation, input device 114 includes a hardware input device, a software interface element, or a combination thereof. Examples of hardware input devices include: switches, buttons, trackballs, rotatable devices (e.g., knobs), scroll wheels, joysticks, keyboards, hardware sliders, an inertial measurement unit ("IMU"), and the like. Examples of software interface elements include: checkboxes, radio buttons, dropdown lists, list boxes, buttons, toggles, text fields, icons, software sliders, softkeys, virtual keyboards, and the like. In one implementation, a software interface element is presented within a graphical user interface ("GUI"). In one implementation, input device 114 includes a voice assistant application executing in a computing environment and an auditory sensor (e.g., a microphone) providing auditory input to the voice assistant application via an application programming interface ("API").

FIG. 2 is a block diagram of an example electronic device that is suitable for implementing aspects of the present disclosure. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations device 110 includes one or more processors 202 (e.g., microprocessors, ASICs, FPGAs, GPUs, CPUs, processing cores, and/or the like), one or more I/O devices 204, one or more interior and/or exterior facing image sensor systems 206, one or more displays 208, one or more communication interfaces 210 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 212, a memory 220, and one or more communication buses 250 for interconnecting these and various other components. In brief, a GPU can include a specialized electronic circuit designed to rapidly manipulate and alter memory to accelerate the creation of images in a frame buffer. A GPU can be present on a video card, or it can be embedded on a motherboard or—in certain CPUs—on the CPU die.

The one or more I/O devices 204 are configured to provide an interface for exchanging commands, requests, information, data, and the like, between device 110 and a user. The one or more I/O devices 204 can include, but are not limited to, input device 114, a keyboard, a pointing device, a microphone, a joystick, and the like.

The one or more image sensor systems 206 comprise an image sensor (e.g., image sensor 112) configured to obtain content representing a view corresponding to a physical setting in which device 110 is located ("physical content"). In one implementation, image sensor 112 is part of an array of image sensors configured to capture light field images corresponding to a physical setting in which electronic device 200 is located. In one implementation, image sensor 212 is disposed on an exterior surface of device 110. Examples of suitable image sensors for effectuating image sensors of the one or more image sensor systems 206 may include one or more RGB camera (e.g., with a complimentary metal-oxide-semiconductor ("CMOS") image sensor or a charge-coupled device ("CCD") image sensor), monochrome camera, IR camera, event-based camera, and/or the like.

In some implementations, the one or more image sensor systems 206 are configured to obtain image data that corresponds to at least a portion of the face of the user that includes the eyes of the user. In various implementations, the one or more image sensor systems 206 further include illumination sources that emit light upon the portion of the face of the user, such as a flash or a glint source.

In some implementations, the one or more displays 208 are configured to present content such as SR content, as described below in greater detail, to the user. In some implementations, the one or more displays 208 correspond to holographic, digital light processing ("DLP"), liquid-crystal display ("LCD"), liquid-crystal on silicon ("LCoS"), organic light-emitting field-effect transitory ("OLET"), organic light-emitting diode ("OLED"), surface-conduction electron-emitter display ("SED"), field-emission display ("FED"), quantum-dot light-emitting diode ("QD-LED"), micro-electro-mechanical system ("MEMS"), and/or the like display types. In some implementations, the one or more 208 correspond to diffractive, reflective, polarized, holographic, etc. waveguide displays. In some implementations, the one or more displays 208 are capable of presenting any combination of physical content and virtual content.

In one implementation, the one or more displays 208 includes a display device comprising a plurality of pixels and is configured to present content comprising image data obtained using image sensor 112. Each pixel among the plurality of pixels may be implemented using light-emitting diodes (LEDs), organic light-emitting diodes (OLEDs), plasma cells, liquid crystal display (LCD) components, and the like. In one implementation, the one or more displays 208 are disposed on an inward facing surface of device 110.

In one implementation, the one or more displays 208 include a stereoscopic image display for presenting left-eye and right-eye view points. In one implementation, the stereoscopic image display presents a stereoscopic subset of a 3D representation of a physical setting corresponding to a physical setting (e.g., physical setting 105 of FIG. 1) in which device 110 is located. In one implementation, the 3D representation of the physical setting is reconstructed using light field images captured by an array of image sensors included in image sensor system 206.

The one or more communication interfaces 210 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

The one or more programming interfaces 212 are configured to provide an interface for exchanging commands, requests, information, data, and the like, between components of device 110 and other components of device 110 or components of a computing device external to electronic device. The one or more programming interfaces 212 can include, but are not limited to, input device 114, a machine-to-machine interface ("M2M"), an API, and the like.

The memory 220 can include any suitable computer-readable medium. A computer readable storage medium should not be construed as transitory signals per se (e.g., radio waves or other propagating electromagnetic waves, electromagnetic waves propagating through a transmission media such as a waveguide, or electrical signals transmitted through a wire). For example the memory 220 may include high-speed random-access memory, such as DRAM, SRAM, DDR RAM, or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. Instructions stored in the memory 220 may be executed by the one or more processors 202 to perform a variety of methods and operations, including the technique for enriching locally-sourced image data described in greater detail below.

In some implementations, the memory 220 or the non-transitory computer readable storage medium of the memory 220 stores the following programs, modules and data structures, or a subset thereof including an optional operating system 230 and a view enrichment module 240. The operating system 230 includes procedures for handling various basic system services and for performing hardware dependent tasks. In some implementations, the view enrichment module 240 is configured to present content representing a standard view or an enriched view of a physical setting or physical setting to the user via the one or more displays 208. To that end, in various implementations, the view enrichment module 240 includes a data obtaining unit 242, an enrichment effect unit 244, an eye tracking unit 246, and a data transmitting unit 248.

In some implementations, the data obtaining unit 242 is configured to obtain data (e.g., presentation data, interaction data, sensor data, location data, etc.) from one or more computing devices external to device 110. To that end, in various implementations, the data obtaining unit 242 includes instructions and/or logic therefor, and heuristics and metadata therefor.

In some implementations, the enrichment effect unit 244 is configured to form content representing an enriched view of a physical setting or physical setting depicted in image data generated by image sensor system 206 for presentation on the one or more displays 208. To that end, in various implementations, the enrichment effect unit 244 includes instructions and/or logic therefor, and heuristics and metadata therefor.

In some implementations, the eye tracking unit 246 is configured to determine an eye tracking characteristic of a user based on image data received from an image sensor of image sensor system 206. To that end, in various implementations, the eye tracking unit 246 includes instructions and/or logic therefor, and heuristics and metadata therefor.

In some implementations, the data transmitting unit 248 is configured to transmit data (e.g., presentation data, location data, etc.) to one or more computing devices external to device 110. To that end, in various implementations, the data transmitting unit 248 includes instructions and/or logic therefor, and heuristics and metadata therefor.

Although the data obtaining unit 242, the enrichment effect unit 244, the eye tracking unit 246, and the data transmitting unit 248 are shown as residing on a single device (e.g., device 110), it should be understood that in other implementations, any combination of the data obtaining unit 242, the enrichment effect unit 244, the eye tracking unit 246, and the data transmitting unit 248 may be located in separate computing devices.

FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
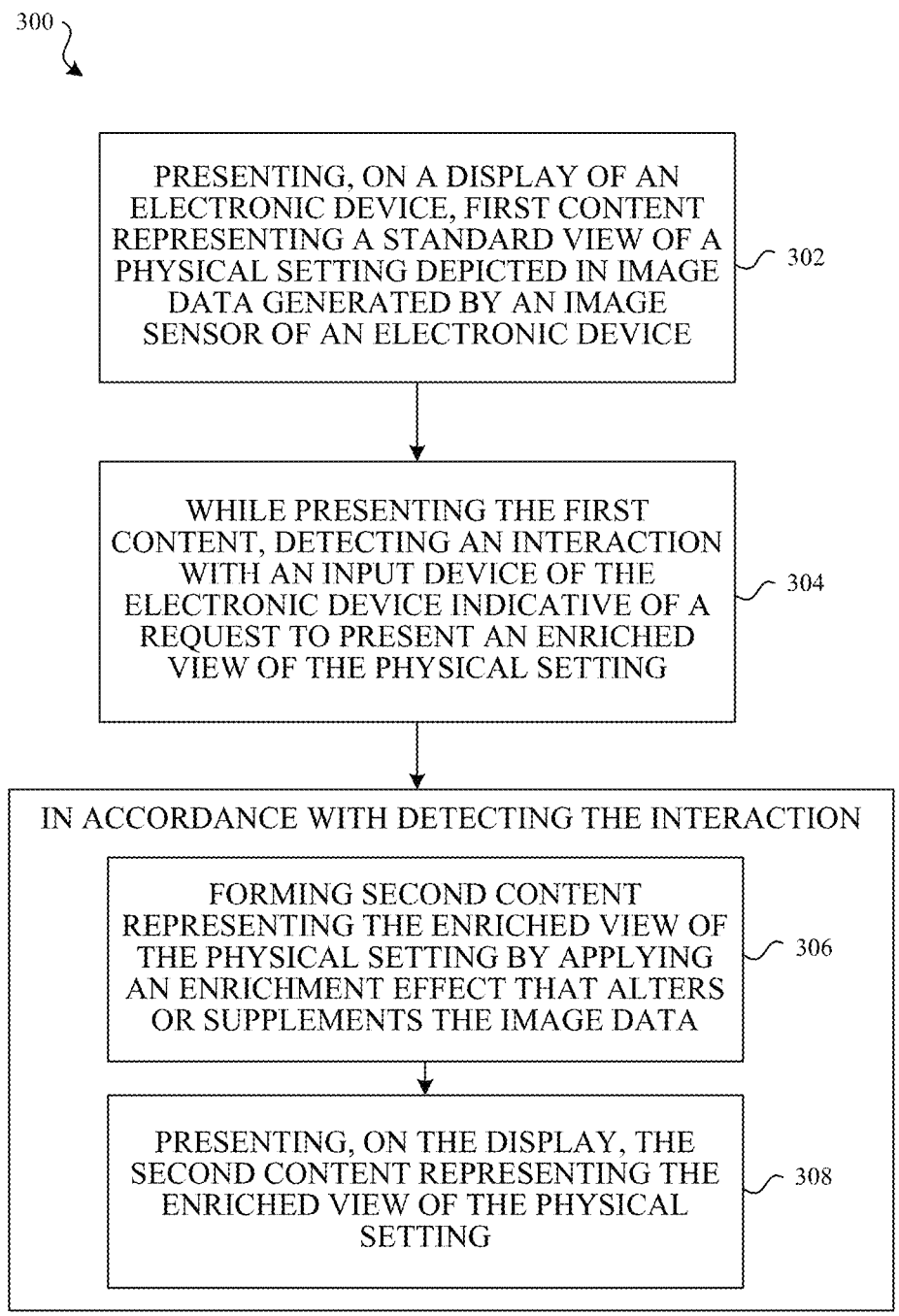
FIG. 3 is a flow-chart illustrating an example of a method for enriching locally sourced image data.

FIG. 3 is a flow-chart illustrating an example of a method 300 for enriching locally sourced image data. At block 302, method 300 includes presenting, on a display of an electronic device, first content representing a standard view of a physical setting depicted in image data generated by an image sensor of the electronic device. In one implementation, the first content is a video of the physical setting comprising a sequence of images of the physical setting. At block 304, method 300 includes, while presenting the first content, detecting an interaction with an input device of the electronic device indicative of a request to present an enriched view of the physical setting. In accordance with detecting the interaction, method 300 includes forming second content representing the enriched view of the physical setting by applying an enrichment effect that alters or supplements the image data, at block 306. In one implementation, enrichment effect unit 244 applies the enrichment effect that alters or supplements the image data. At block 308, method 300 includes presenting, on the display, the second content representing the enriched view of the physical setting. The second content may be part of an SR experience.

Figure 4:
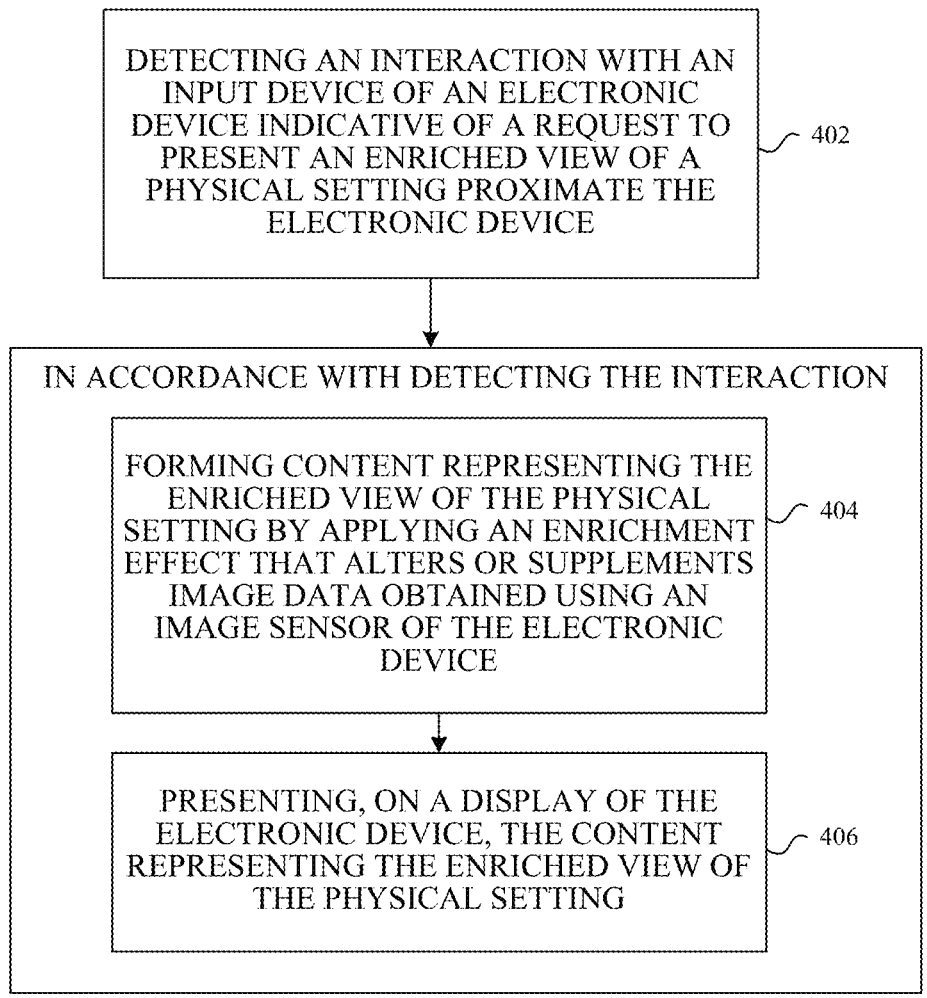
FIG. 4 is a flow-chart illustrating another example of a method for enriching locally sourced image data.

FIG. 4 is a flow-chart illustrating another example of a method 400 for enriching locally sourced image data. At block 402, method 400 includes detecting an interaction with an input device of an electronic device indicative of a request to present an enriched view of a physical setting proximate to the electronic device. In accordance with detecting the interaction, method 400 includes forming content representing the enriched view of the physical setting by applying an enrichment effect that alters or supplements image data obtained using an image sensor of the electronic device, at block 404. In one implementation, enrichment effect unit 244 applies the enrichment effect that alters or supplements the image data. At block 406, method 400 includes presenting, on a display of the electronic device, the content representing the enriched view of the physical setting. The content may be part of an SR experience. In one implementation, the display is a see-through display with a portion of the physical setting being visible through the see-through display. In one implementation, the display is a display device comprising a plurality of pixels.

In one implementation, method 300 and/or method 400 is performed by processing logic, including hardware, firmware, software, or a combination thereof. In one implementation, method 300 and/or method 400 is performed by a processor executing code stored in a non-transitory computer-readable medium (e.g., a memory).

In accordance with some implementations, applying an enrichment effect to form an enriched view of a physical setting may involve identifying or detecting an object in the physical setting. In one implementation, applying the enrichment effect may comprise identifying the object and applying the enrichment effect to a subset of the image data that corresponds to the object. One skilled in the art will recognize that there are various techniques that may be utilized to identify or detect an object.

For example, the object may be identified using gaze tracking information obtained for a user. In one implementation, gaze tracking information for a user is obtained using eye tracking unit 246 of FIG. 2. As another example, the object may be identified by evaluating image data depicting the physical setting that is generated by an image sensor (e.g., image sensor 112). In one implementation, if the object is a human face, the object may be identified by evaluating a subset of the image data that corresponds to the object with a facial recognition application. Implementations track spatial locations of such objects over time using the image sensor to dynamically update the enriched view of the physical setting as the spatial locations change over time.

In one implementation, forming the enriched view of the object comprises forming an expanded view of the object (e.g., expanded view 610 of FIG. 6) by increasing a quantity of pixels in the display that are occupied by the subset of the image data. In one implementation, forming content representing the enriched view is based on the enriched view of the object. In one implementation, applying the enrichment effect comprises forming a compressed view of the physical setting surrounding the object (e.g., compressed view 620 of FIG. 6) by decreasing a quantity of pixels in the display that are occupied by the image data that is excluded from the subset of image data.

Figure 7:
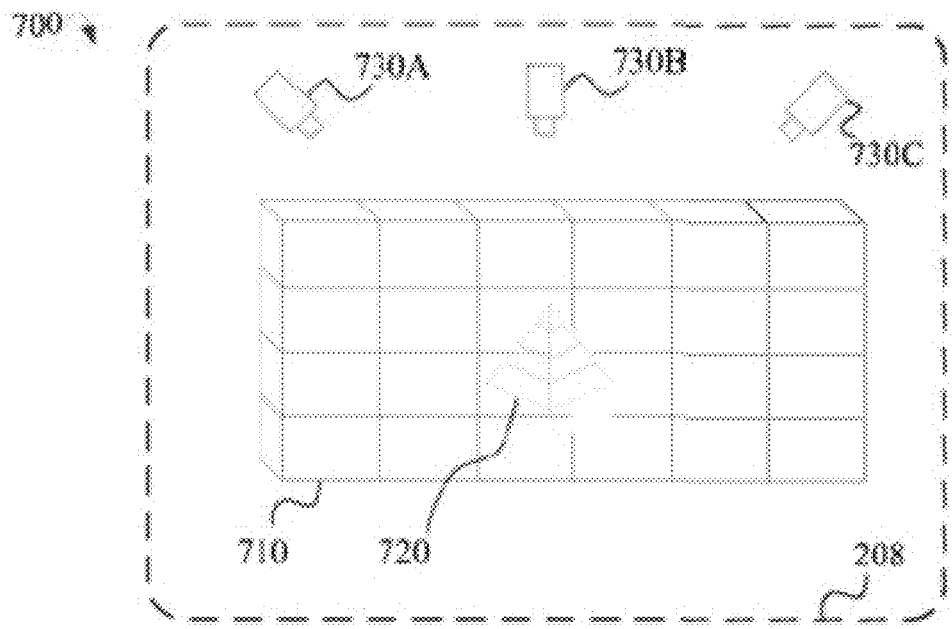
FIG. 7 illustrates another example of presenting content on a display of an electronic device that represents a standard view of a physical setting depicted in image data generated by an image sensor of the electronic device.

In one implementation, forming the enriched view of the object comprises detecting an occlusion object in a physical setting or physical setting that intervenes between the display and an obstructed area of the physical setting (e.g., standard view 700 of FIG. 7). In one implementation, forming the enriched view of the object further comprises overlaying a region of the display corresponding to the obstructed area with externally-sourced image data that depicts the obstructed area (e.g., enriched view 800 of FIG. 8).

In one implementation, method 300 and/or method 400 further includes detecting a subsequent interaction with the input device indicative of a subsequent request to present an expanded view of the obstructed area. In one implementation, in response to detecting the subsequent interaction, method 300 and/or method 400 further includes forming third content representing the expanded view of the obstructed area by applying a further enrichment effect to the externally-sourced image data and presenting, on the display, the third content representing the expanded view of the obstructed area. In one implementation, applying the further enrichment effect involves increasing a quantity of pixels in the display that are occupied by the externally-sourced image data. In one implementation, the input device is rotatable in at least two directions. In one implementation, the interaction and the subsequent interaction are rotations in different directions of the at least two directions. In one implementation, the interaction and the subsequent interaction are rotations in the same direction of the at least two directions.

In one implementation, applying the enrichment effect comprises overlaying a region of the display with visibility reduction content to form an enhanced focus view (e.g., enriched view 1000 of FIG. 10) of the physical setting. In one implementation, applying the enrichment effect comprises overlaying a region of the display corresponding to the object with visibility reduction content to form a censored view (e.g., enriched view 1100 of FIG. 11) of the physical setting.

Figure 12:
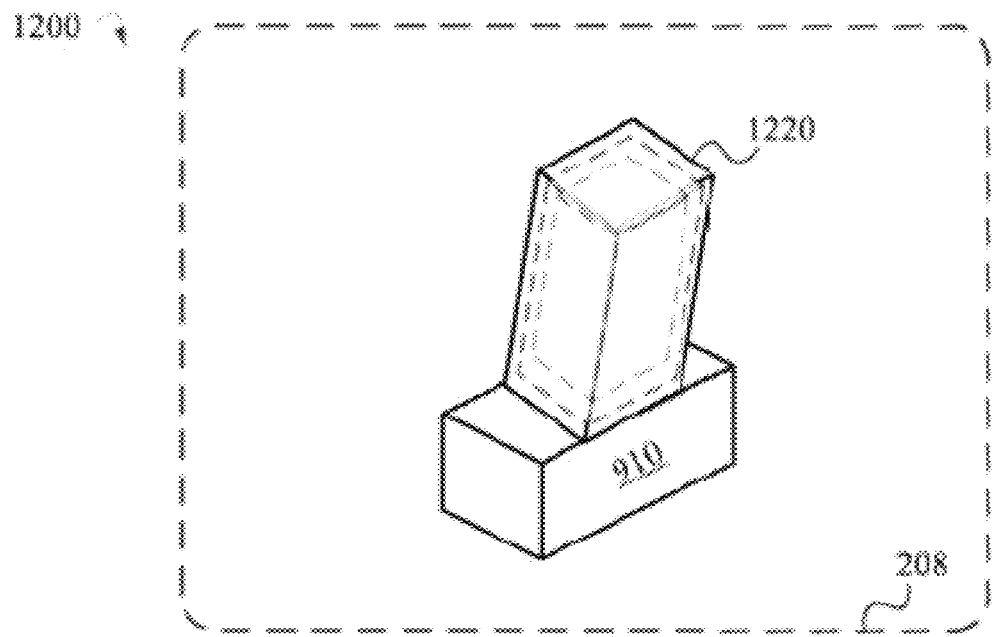
FIG. 12 illustrates another example of presenting content on the display of the electronic device that represents an enriched view of the physical setting depicted in FIG. 9.

In one implementation, applying the enrichment effect comprises superimposing virtual image data corresponding to a virtual object over a region of the display that corresponds to an object in the physical setting to form an enriched view (e.g., enriched view 1200 of FIG. 12). In one implementation, applying the enrichment effect comprises overlaying at least a subset of the image data with data corresponding to non-visible wavelength image data to present a hyperspectral view (e.g., hyperspectral view 1300 of FIG. 13) of a physical setting or physical setting proximate to an electronic device.

Some implementations of the present invention describe an input device (e.g., input device 114) in terms of a human-to-machine interface ("HMI") for the sake of enablement. In these implementations, interactions with the input device indicative of requests to present an enriched view of a physical setting by a device 110 or requests to present an enriched view of a physical setting proximate to device 110 are described in terms of inputs, instructions, or commands originating from a user of the electronic device to obtain a desired output from the electronic device by virtue of the input device being described in terms of an HMI. However, implementations are not limited to such requests originating from a user of an electronic device via an HMI.

For example, in some implementations, requests to present an enriched view of a physical setting by a device 110 may originate from an event handler (or listener). The event handler is configured to generate such requests in response to receiving an event notification from an event source. In one implementation, the event handler is effectuated using computing resources provided by device 110. In one implementation, the event handler is effectuated using computing resources provided by a computing device external to device 110. In one implementation, the event handler receives event notifications via a communication interface (e.g., the one or more communication interfaces 210 of FIG. 2) of device 110. In one implementation, an event handler is associated with a machine-to-machine interface ("M2M") or an API (e.g., the one or more programming interfaces 212 of FIG. 2) of device 110.

Event notifications are sent by an event source configured to monitor for an occurrence of a pre-defined event. In one implementation, an event source is a local event source effectuated using computing resources (e.g., the one or more processors 202 and/or memory 220 of FIG. 2) provided by device 110. In one implementation, an event source is a remote event source effectuated using computing resources provided by a computing device external to device 110.

By way of example, a user of device 110 may receive a video call from a friend using a messaging application while content representing a standard view of a physical setting (or physical setting proximate to device 110) is presented on display 208. In this example, reception of an incoming communication (i.e., the video call) may define a pre-defined event. More generally, receiving a request by an application (or process) executing, at least in part, on device 110 to present a visual object on display 208 may define a pre-defined event. An event source monitoring for an occurrence of that pre-defined event would send an event notification to an event handler. In response to receiving that event notification, the event handler would generate a request to present content representing an enriched view of the physical setting on display 208.

In accordance with receiving that request, enrichment effect unit 244 may apply an enrichment effect that alters or supplements image data generated by an image sensor (e.g., image sensor 112) of device 110 that depicts the physical setting to form content representing the enriched view of the physical setting. In this example, applying the enrichment effect may include overlaying a subset of the image data depicting the physical setting with image data corresponding to the visual object (e.g., a windowed view populated with image data corresponding to the video call). In one implementation, the visual object comprises virtual content, physical content, or a combination thereof. View enrichment module 240 may then present the content representing the enriched view of the physical setting on display 208.

Continuing with this example, while presenting the enriched view of the physical setting comprising the visual object, an eye tracking unit (e.g., eye tracking unit 246) may determine an eye tracking characteristic of the user that indicates the user is looking at the visual object. The user looking at the visual object may define a second pre-defined event. The event source monitoring for an occurrence of that second pre-defined event would send another event notification to the event handler. In response to receiving that event notification, the event handler would generate a second request to present content representing an enhanced focus view of the physical setting on display 208.

In accordance with receiving that request, enrichment effect unit 244 may apply another enrichment effect that further alters or supplements the image data generated by the image sensor of device 110 to form content representing an enhanced focus view of the physical setting. In this example, applying that enrichment effect may include overlaying a region of display 208 surrounding the visual object with visibility reduction content to form the enhanced focus view of the physical setting, as described in greater detail below with respect to FIG. 10. View enrichment module 240 may then present the content representing the enhanced focus view of the physical setting on display 208.

As another example, a moving physical object may be detected in a physical setting (proximate to device 110) while content representing a standard view of the physical setting is presented on display 208. In this example, the moving physical object being detected in the physical setting may define a pre-defined event. An event source monitoring for an occurrence of that pre-defined event would send an event notification to an event handler. In response to receiving that event notification, the event handler would generate a request to present content representing an enriched view of the physical setting on display 208.

In accordance with receiving that request, enrichment effect unit 244 may apply an enrichment effect that alters or supplements image data generated by an image sensor (e.g., image sensor 112) of device 110 that depicts the physical setting to form content representing the enriched view of the physical setting. In this example, one enrichment effect may be applied to a subset of the image data within the image data that corresponds to the moving physical object. Applying that enrichment effect to the subset of the image data forms an enriched view of the moving physical object. Enrichment effect unit 244 may form the enriched view of the moving physical object by forming an expanded view of the moving physical object. Forming the expanded view of the moving physical object involves increasing a quantity of pixels in display 208 that are occupied by the subset of image data, as discussed in greater detail below with reference to FIGS. 5 and 6. The content representing the enriched view of the physical setting is then formed based on the enriched view of the moving physical object. View enrichment module 240 may then present the content representing the enriched view of the physical setting on display 208.

In this example, another enrichment effect may be applied to the image data that is excluded from the subset of image data that corresponds to the moving object. Applying that enrichment effect to the image data that is excluded from the subset of image data forms a compressed view of the physical setting surrounding the moving physical object. Enrichment effect unit 244 may form the compressed view of the physical setting surrounding the moving physical object by decreasing a quantity of pixels in display 208 that are occupied by the image data that is excluded from the subset of image data, as discussed in greater detail below with reference to FIGS. 5 and 6. View enrichment module 240 may then present this content representing the enriched view of the physical setting on display 208.

Continuing with this example, while presenting the enriched view of the physical setting based on the enriched view of the moving physical object, an eye tracking unit (e.g., eye tracking unit 246) may determine an eye tracking characteristic of the user that indicates the user is looking at the enriched view of the moving physical object. The user looking at the enriched view of the moving physical object may define a second pre-defined event. The event source monitoring for an occurrence of that second pre-defined event would send another event notification to the event handler. In response to receiving that event notification, the event handler would generate a second request to present content representing a further enriched view of the physical setting on display 208.

In accordance with receiving that request, enrichment effect unit 244 may apply another enrichment effect that further alters or supplements the image data generated by the image sensor of device 110 to form content representing the further enriched view of the physical setting. In this example, applying that enrichment effect may include superimposing virtual image data corresponding to a virtual object over a region of display 208 that corresponds to the moving physical object, as discussed in greater detail below with reference to FIGS. 9 and 12. For example, the virtual object may be a visible frame circumscribing the enriched view of the moving physical object on display 208. View enrichment module 240 may then present this content representing the further enriched view of the physical setting on display 208.

As another example, a user of device 110 may be approaching a night club on a sidewalk outside the night club while content representing a standard view of a physical setting (or physical setting proximate to device 110) is presented on display 208. As the user approaches the night club, view enrichment module 240 may identify the night club as a location that supports remote viewing. In one implementation, a location that supports remote viewing may be identified using a GPS receiver of device 110. In one implementation, a location that supports remote viewing may be identified using beacon signals (e.g., BLUETOOTH low energy ("BLE") beacon signals) received by device 110 from a beacon device of the location. In this example, the identification of a location proximate to device 110 that supports remote viewing may define a pre-defined event. An event source monitoring for an occurrence of that pre-defined event would send an event notification to the event handler. In response to receiving that event notification, the event handler would generate a request to present content representing an enriched view of the physical setting on display 208.

In accordance with receiving that request, enrichment effect unit 244 may apply an enrichment effect that alters or supplements image data generated by an image sensor (e.g., image sensor 112) of device 110 that depicts the physical setting to form content representing the enriched view of the physical setting. In this example, applying the enrichment effect involves enrichment effect unit 244 overlaying a subset of the image data depicting the physical setting with externally-sourced image data (e.g., image data from security cameras within the night club) depicting an obstructed area (i.e., the dance floor), as described in greater detail below with respect to FIGS. 7 and 8.

Figure 5:
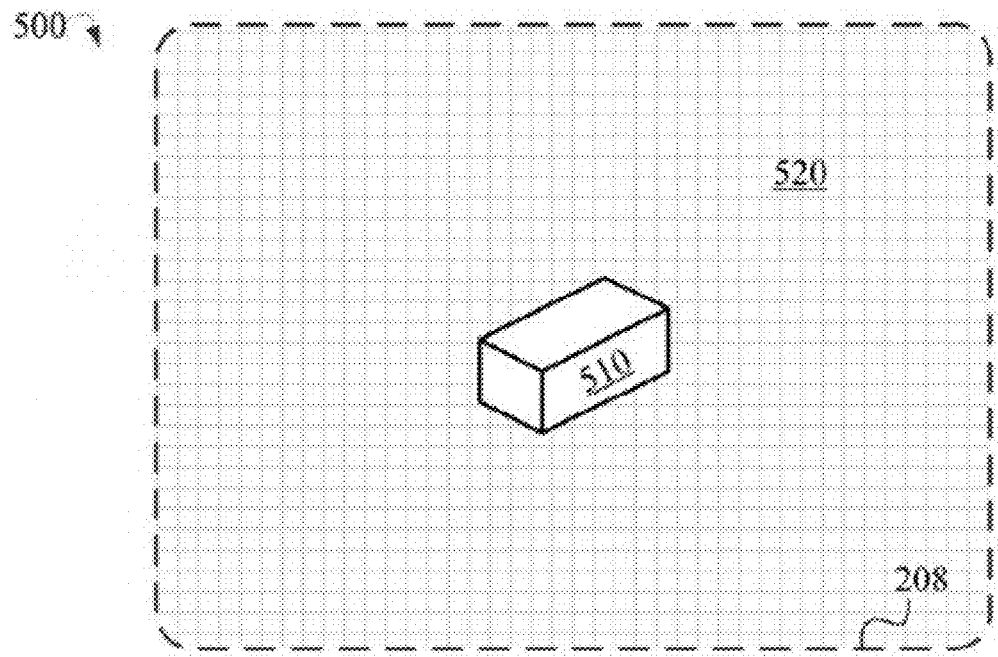
FIG. 5 illustrates an example of presenting content on a display of an electronic device that represents a standard view of a physical setting depicted in image data generated by an image sensor of the electronic device.
Figure 6:
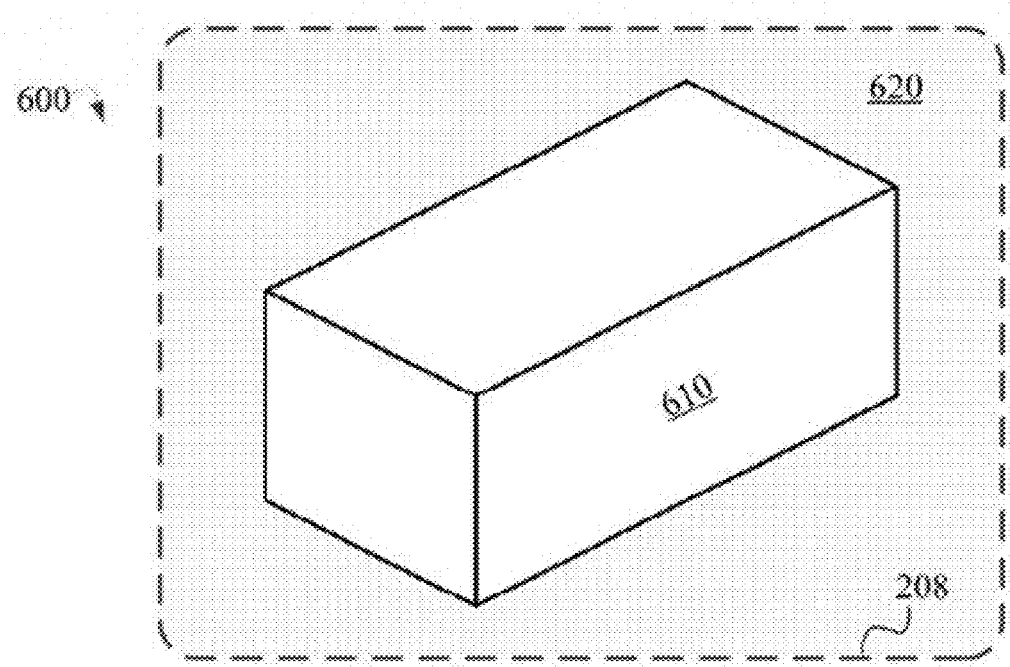
FIG. 6 illustrates an example of presenting content on the display of the electronic device that represents an enriched view of the physical setting depicted in FIG. 5.

FIGS. 5-6 are examples of display 208 presenting content representing a standard view 500 of a physical setting (e.g., physical setting 105 of FIG. 1) depicted in image data generated by an image sensor (e.g., image sensor 112) and an enriched view 600 of the physical setting, respectively. The standard view 500 of the physical setting in FIG. 5 includes a standard view 510 of an object (e.g., object 120 of FIG. 1) and a standard view 520 of a physical setting surrounding the object ("surrounding physical setting"). The enriched view 600 of the physical setting in FIG. 6 includes an expanded view 610 of the object in the physical setting and a compressed view 620 of the surrounding physical setting. A comparison between the FIGS. 5 and 6 illustrates two distinctions between the standard view 500 of the physical setting and the enriched view 600 of the physical setting.

One distinction is that the expanded view 610 of the object occupies a larger area of display 208 than the standard view 510 of the object. The expanded view 610 of the object enriches the standard view 500 of the physical setting in as much as minute details of the object are enlarged thereby increasing a likelihood that minute details of the object are perceivable by a user. To form the expanded view 610 of the object, an enrichment effect is applied to a subset of the image data depicting the physical setting that corresponds to the object.

Applying that enrichment effect increases a quantity of pixels in display 208 that are occupied by the subset of the image data. In one implementation, applying the enrichment effect to the subset of the image data involves oversampling the subset of the image data to form the expanded view 610 of the object. In one implementation, applying the enrichment effect to the subset of the image data involves performing an optical zoom to form the expanded view 610 of the object.

Another distinction is that the compressed view 620 of the surrounding physical setting occupies a smaller area of display 208 that the standard view 510 of the surrounding physical setting. Providing the compressed view 620 of the surrounding physical setting along with the expanded view 610 of the object enriches the standard view 500 of the physical setting by retaining contextual information concerning the object's surroundings. At least a portion of that contextual information may be lost by simply enlarging the standard view 510 of the object to occupy a larger area of display 208. To form the compressed view 620 of the surrounding physical setting, an enrichment effect is applied to the image data ("excluded image data") that is excluded from the subset of the image data that corresponds to the object.

Applying that enrichment effect decreases a quantity of pixels in display 208 that are occupied by the excluded image data. In one implementation, applying the enrichment effect to the excluded image data involves warping the excluded image data to form the compressed view 620 of the surrounding physical setting. As recognized by those skilled in the art, image warping generally involves manipulating or transforming image data such that positions of pixels comprising the image data change between a pre-warped state and a post-warped state. In one implementation, applying the enrichment effect to the excluded image data involves subsampling the excluded image data to form the compressed view 620 of the surrounding physical setting.

Figure 8:
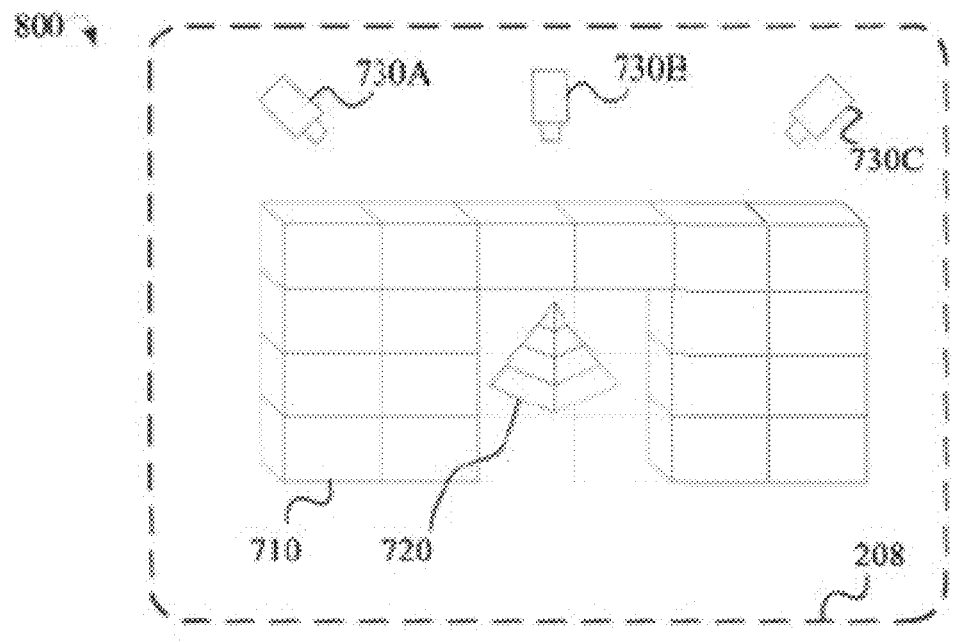
FIG. 8 illustrates an example of presenting content on the display of the electronic device that represents an enriched view of the physical setting depicted in FIG. 7.

FIGS. 7-8 are examples of display 208 presenting content representing a standard view 700 of a physical setting or physical setting depicted in image data generated by an image sensor (e.g., image sensor 112) and an enriched view 800 of the physical setting, respectively. In the standard view 700 of the physical setting seen in FIG. 7, an occlusion object 710 prevents an obstructed area including object 720 from being visible in display 208. In one implementation, applying an enrichment effect to form enriched view 800 includes detecting occlusion object 710.

As an example, occlusion object 710 may represent an exterior wall of a night club, the obstructed area may represent a dance floor of the night club, and object 720 may represent one or more patrons of the night club. In this example, a user of device 110 standing outside of the night club may wish to see how many patrons are in the night club before entering. Continuing with this example, to request enriched view 800 of FIG. 8 (and thereby see how many patrons are in the night club before entering), the user may interact with input device 114 in a manner indicative of the request. In accordance with detecting such an interaction with input device 114, an enrichment effect is applied to a subset of the image data corresponding to the obstructed area to form content representing enriched view 800 of FIG. 8.

Figure 9:
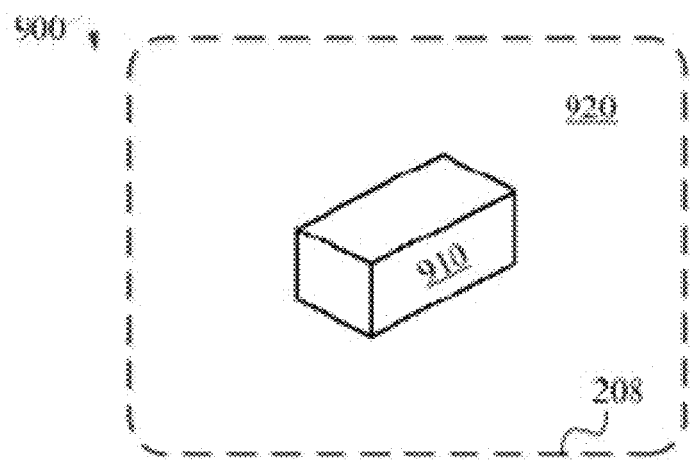
FIG. 9 illustrates another example of presenting content on a display of an electronic device that represents a standard view of a physical setting depicted in image data generated by an image sensor of the electronic device.

Applying the enrichment effect involves obtaining externally-sourced image data that depicts the obstructed area including object 720. In FIGS. 8-9, the externally-sourced image data that depicts the obstructed area is available from remote image sources 730A-730C. One or more of remote image sources 730A-730C have a partially or fully unobstructed view of the obstructed area. The externally-sourced image data is obtained using one or more wired and/or wireless communication links that data obtaining unit 242 establishes by interacting with communication interfaces 210. Continuing with the example above, remote image sources 730A-730C may represent security cameras disposed within the night club.

In one implementation, externally-sourced image data is directly obtained from a remote image source that generates the externally-sourced image data. Using the night club example, a server associated with the night club may publish a web service for directly accessing image data feeds produced by remote image sources 730A-730C. In one implementation, externally-sourced image data is indirectly obtained from a remote image source that generates the externally-sourced image data via a remote computing device that receives the externally-sourced image data from the remote image source. In the night club example, the remote computing device may represent a security office of the night club that receives the externally-sourced image data from the security cameras via wired or wireless communication channels. That security office may either be monitoring the night club locally or externally in an off-site location.

In one implementation, the externally-sourced image data is obtained by generating a mosaic view of the obstructed area using data obtained from a plurality of remote image sources having partially overlapping views of the physical setting. In the night club example, the remote image sources 730A-730C representing the security cameras may have partially overlapping views of the dance floor. A mosaic view of the dance floor may be generated using data obtained from two or more of the security cameras. For example, enrichment effect unit 244 may perform an image stitching process on data obtained from remote image source 730A-730C to generate a mosaic view of the dance floor. That mosaic view of the dance floor may be used to form content representing enriched view 800. In one implementation, a subset of a mosaic view that corresponds to a perspective of a user of the electronic device is selected to form content representing an enriched view.

In one implementation, the externally-sourced image data is obtained by constructing a three-dimensional model of the obstructed area using data obtained from a plurality of remote image sources that each have at least a partially unobstructed view of the obstructed area. Continuing with the night club example from the previous implementation, a three-dimensional model of the dance floor may be generated using data obtained from two or more of the security cameras represented by remote image sources 730A-730C. For example, enrichment effect unit 244 may generate a point cloud representation of the dance floor using data obtained from remote image source 730A-730C. In one implementation, a user perspective view of the obstructed area is generated using the three-dimensional model. If the user perspective view is a two-dimensional image presented on display 208 in the night club example, enrichment effect unit 244 may perform a three-dimensional rendering process on the point cloud representation of the dance floor.

In one implementation, applying the enrichment effect to form content representing enriched view 800 includes overlaying a subset of the image data (or a region of display 208) corresponding to occlusion object 710 with the externally-sourced image data. With respect to the night club example, a field of view corresponding to the security camera represented by remote image source 730B may approximate a field of view provided by display 208. As discussed above, remote image source 730B may have a partially or fully unobstructed view of the obstructed area. In that instance, a subset of the image data corresponding to the obstructed area may be overlaid with externally-sourced image data obtained from remote image source 730 to form enriched view 800.

FIG. 9 is an example of display 208 presenting content representing a standard view 900 of a physical setting or physical setting depicted in image data generated by an image sensor (e.g., image sensor 112). FIGS. 10-13 are each an example of display 208 presenting content representing an enriched view of the physical setting depicted in FIG. 9. The standard view 900 of the physical setting in FIG. 9 includes a standard view 910 of an object (e.g., object 120 of FIG. 1) and a standard view 920 of the surrounding physical setting.

Figure 10:
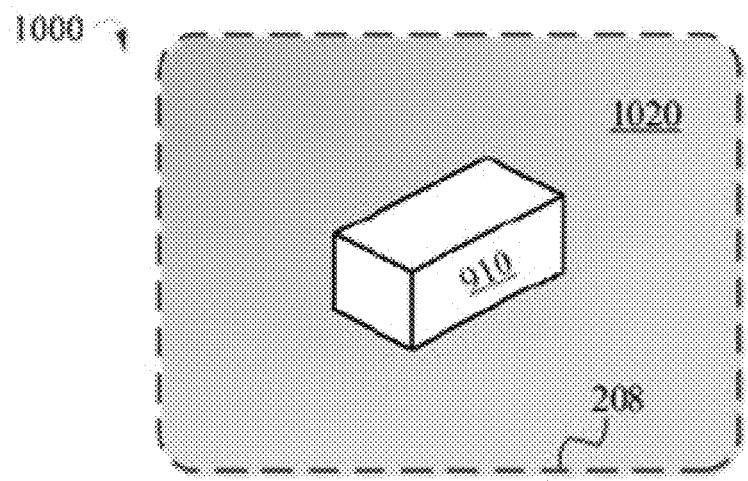
FIG. 10 illustrates an example of presenting content on the display of the electronic device that represents an enriched view of the physical setting depicted in FIG. 9.

As shown by FIG. 10, while the standard view 910 of the object is retained from the standard view 900, the standard view 920 of the surrounding physical setting becomes an enriched view 1020 of the surrounding physical setting in the enriched view 1000. Through this distinction, the enriched view 1000 of FIG. 10 represents an enhanced focus view of the physical setting. To form content representing the enriched view 1000, enrichment effect unit 244 applies an enrichment effect to a subset of the image data that corresponds to the surrounding physical setting. In one implementation, applying the enrichment effect comprises overlaying a region of display 208 surrounding the object with visibility reduction content to form the enhanced focus view of the physical setting. Overlaying the region of display 208 surrounding the object with visibility reduction content may involve enrichment effect unit 244 processing a subset of the image data that corresponds to the surrounding physical setting with a Gausian Blur function, a global tint function, and the like.

By way of example, the physical setting may include a crowd of people and the object represents a user's friend in the crowd of people. In this example, the user's friend and the other people in the crowd would be equally visible in the standard view 900. However, in the enriched view 1000, the other people in the crowd would be less visible than the user's friend. In this example, enrichment effect unit 244 may overlay a region of display 208 surrounding the user's friend (e.g., the region including the other people in the crowd) with visibility reduction content thereby improving the friend's visibility with respect to the other people in the crowd.

As another example, a user may be participating in an ongoing video call and the object may represent a virtual object associated with the ongoing video call that is presented on display 208. In this example, the virtual object associated with the ongoing video call and the surrounding physical setting would be equally visible in the standard view 900. However, in the enriched view 1000, the surrounding physical setting would be less visible than the virtual object associated with the ongoing video call. In this example, enrichment effect unit 244 may overlay a region of display 208 surrounding the virtual object (e.g., the surrounding physical setting) with visibility reduction content thereby improving the virtual object's visibility with respect to the surrounding physical setting.

Figure 11:
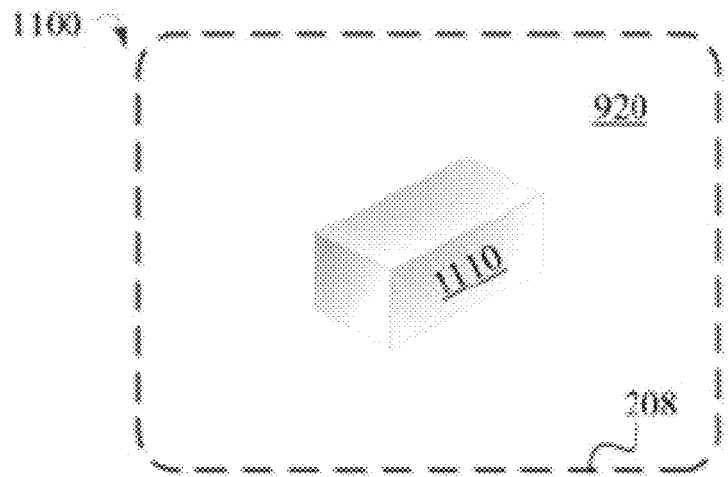
FIG. 11 illustrates another example of presenting content on the display of the electronic device that represents an enriched view of the physical setting depicted in FIG. 9.

As shown by FIG. 11, while the standard view 920 of the surrounding physical setting is retained from the standard view 900, the standard view 910 of the object becomes an enriched view 1110 of the object in enriched view 1100. Through this distinction, the enriched view 1100 of FIG. 11 represents a censored view of the physical setting. To form content representing the enriched view 1100, enrichment effect unit 244 applies an enrichment effect to a subset of the image data that corresponds to the object. In one implementation, applying the enrichment effect comprises overlaying a region of display 208 corresponding to the object with visibility reduction content to form the censored view of the physical setting. Overlaying the region of display 208 corresponding to the object with visibility reduction content may involve enrichment effect unit 244 processing a subset of the image data that corresponds to the object with a Gausian Blur function, a global tint function, and the like.

By way of example, the object may correspond to an overly bright light located above a user as they traverse a hallway. In this example, a visibility of a distant portion of the hallway may be reduced in the standard view 900 as a result of the user's eyes adjusting to the overly bright light. However, in the enriched view 1100, the visibility of the distant portion of the hallway may be increased by reducing a visibility of the overly bright light. In this example, enrichment effect unit 244 may identify the overly bright light by determining that a brightness value of a subset of the image data (corresponding to the overly bright light) exceeds a pre-defined brightness level. Enrichment effect unit 244 may further adjust the brightness value corresponding to that subset of the image data below a defined threshold value.

As another example, a user may not want to perceive any advertisements as they enjoy device 110 and the object may represent a billboard depicting an advertisement. In this example, the billboard and the surrounding physical setting would be equally visible in the standard view 900. However, in the enriched view 1100, the billboard would be less visible than the surrounding physical setting. In this example, enrichment effect unit 244 may overlay a region of display 208 corresponding to the billboard with visibility reduction content thereby reducing the billboard's visibility with respect to the surrounding physical setting. In one implementation, enrichment effect unit 244 may identify billboard as depicting an advertisement by processing a subset of the image data corresponding to the billboard with an image recognition process or a text recognition process.

As shown by FIG. 12, enriched view 1200 retains the standard view 910 of the object from the standard view 900 of FIG. 9. However, in enriched view 1200 virtual image data corresponding to a virtual object 1220 is superimposed over a subset of the image data corresponding to the standard view 910 of the object. In one implementation, the virtual image data corresponding to the virtual object 1220 is generated within a computing environment effectuated using computing resources provided by device 110. In one implementation, the virtual image data corresponding to the virtual object 1220 is generated within a computing environment effectuated using computing resources provided a computing device external to device 110.

By way of example, the object depicted in standard view 910 may represent a physical object in a physical setting of device 110. In this example, the physical object may be the hand of a medical doctor that is using device 110 while assessing a patient and virtual object 1220 may represent a three-dimensional representation of the patient's heart. Because the hand may move while the medical doctor is assessing the patient, device 110 may track a spatial location of the hand over time using an image sensor (e.g., image sensor 112) of device 110. With that data, enrichment effect unit 244 may dynamically update a mapping between virtual object 1220 and the hand as the spatial location of the hand changes.

In one implementation, input device 114 may be configured to transition between each of a plurality of layers of virtual object 1220 based on movement of input device 114. Continuing with the previous example, as part of the assessment, the medical doctor may need to individually evaluate each layer of the patient's heart. To facilitate that evaluation, virtual object 1220 is provided with a plurality of layers that each represent a different layer of the patient's heart. As such, the medical doctor may cause movement of input device 114 to individually evaluate the epicardium, myocardium, and endocardium layers of the patient's heart.

In one implementation, input device 114 may be configured to transition between different versions of virtual object 1220 based on movement of input device 114. As part of the assessment described in the example above, the medical doctor may wish to determine whether an ongoing treatment is effective by comparing a current state of the patient's heart with earlier states of the patient's heart. As such, the medical doctor may cause movement of input device 114 to transition between different versions of virtual object 1220 that correspond to the current state and the earlier states of the patient's heart.

Figure 13:
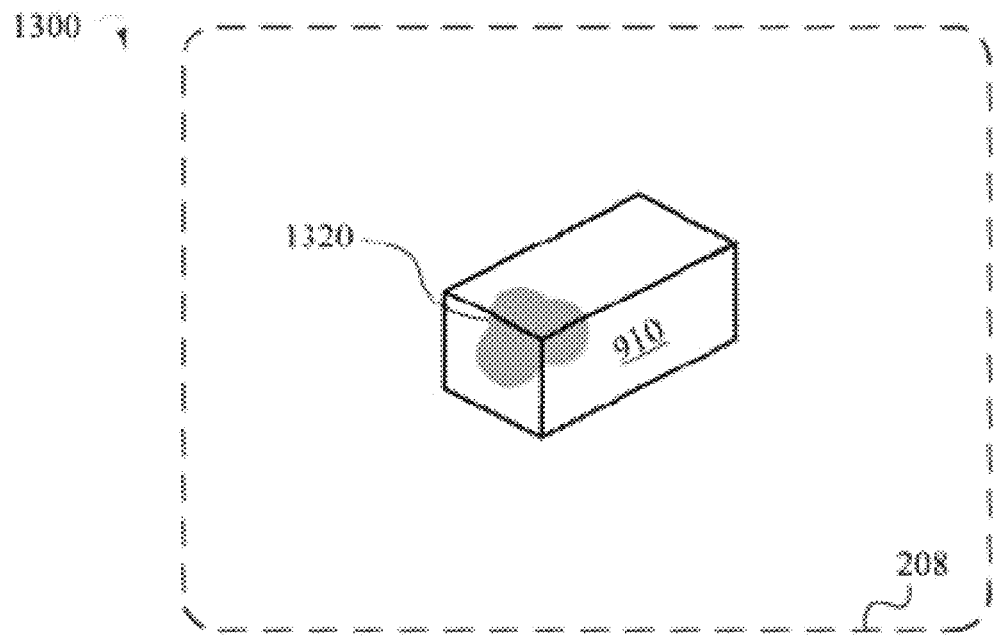
FIG. 13 illustrates another example of presenting content on the display of the electronic device that represents an enriched view of the physical setting depicted in FIG. 9.

In the example illustrated by FIG. 13, enriched view 1300 also retains the standard view 910 of the object from the standard view 900 of FIG. 9. However, in enriched view 1300, at least a subset of the image data corresponding to the standard view 910 of the object is overlaid with data corresponding to non-visible wavelength image data 1320 to form a hyperspectral view of the physical setting. Generally, a view of a physical setting or physical setting is considered "a hyperspectral view of the physical setting" if at least a subset of pixels composing image data depicting the physical setting includes light intensity data for portions of the electromagnetic spectrum that extend beyond the visible light spectrum that is naturally perceivable by a human eye. Stated differently, at least a subset of the pixels composing the image data depicting the hyperspectral view of the physical setting includes non-visible wavelength image data.

By way of example, the object depicted in standard view 910 may represent a physical object in a physical setting of device 110, such as an avocado. An oil content of the avocado is known to be highly correlated with the avocado's maturity (i.e., ripeness). Therefore, the oil content of the avocado is often measured to determine its maturity. One commercial technique of measuring the oil content is called dry matter analysis, which involves removing samples from the fruit and measuring each sample's weight loss after being dried in an oven for a period of time. While the commercial technique is effective, it also represents a destructive means of evaluating an avocado, which may be less than desirable if one wishes to enjoy the avocado.

A non-destructive means of evaluating an avocado's maturity involves emitting light with wavelengths in the visible spectrum and the near-infrared spectrum. The non-destructive means creates an image that depicts a chemical composition of the avocado using light intensity data corresponding to the light that reflects back from the avocado. As such, portions of the intact avocado with excessive oil content associated with over ripeness are visible in that hyperspectral image. In the example of FIG. 13, those portions of the intact avocado may be represented by the non-visible wavelength image data 1320.

In one implementation, enrichment effect unit 244 obtains the non-visible wavelength image data from an auxiliary image sensor of device 110. For example, image sensor systems 206 may include an image sensor configured to detect image data within the infrared spectrum, near-infrared spectrum, ultraviolet spectrum, and the like. In one implementation, enrichment effect unit 244 obtains the non-visible wavelength image data from the image data depicting the physical setting. For example, enrichment effect unit may process the image data with a plurality of passband filters. Each of the plurality of passband filters may be centered on a different wavelength and configured to capture distinct bands of the electromagnetic spectrum. One of the plurality of passband filters may be configured to capture image data associated with the visible spectrum whereas another of the plurality of passband filters may be configured to capture image data associated with the infrared spectrum.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

The present disclosure describes particular implementations and their detailed construction and operation. The implementations described herein are set forth by way of illustration only and not limitation. Those skilled in the art will recognize, in light of the teachings herein, that there may be a range of equivalents to the implementations described herein. Most notably, other implementations are possible, variations can be made to the implementations described herein, and there may be equivalents to the components, parts, or steps that make up the described implementations. For the sake of clarity and conciseness, certain aspects of components or steps of certain implementations are presented without undue detail where such detail would be apparent to those skilled in the art in light of the teachings herein and/or where such detail would obfuscate an understanding of more pertinent aspects of the implementations.

What is claimed is:

1. A method comprising:
at an electronic device with a display, an input device, and a first image sensor:
presenting, on the display, first content representing a standard view of a physical setting depicted in image data generated by the first image sensor;
while presenting the first content, detecting an interaction with the input device indicative of a request to present an enriched view of the physical setting; and
in accordance with detecting the interaction:
identifying an obstructed area and an unobstructed area of the physical setting in the standard view, wherein the obstructed area is not depicted in a subset of the image data;
obtaining externally-sourced image data from a second image sensor, wherein at least a portion of the externally-sourced image data comprises an unobstructed view of the obstructed area;
forming second content representing the enriched view of the physical setting by applying an enrichment effect, wherein the enrichment effect:
alters or supplements the subset of the image data associated with the obstructed area with the externally-sourced image data, and
alters or supplements the subset of the image data associated with the unobstructed area with visibility reduction content, wherein applying the enrichment effect to the subset of the image data associated with the unobstructed area with the visibility reduction content comprises overlaying a region of the display surrounding the obstructed area with the visibility reduction content to form an enhanced focus view of the obstructed area of the physical setting; and
presenting, on the display, the second content representing the enriched view of the physical setting.

2. The method of claim 1, wherein the second image sensor is a remote image source having an unobstructed view of the obstructed area.

3. The method of claim 2, wherein the externally-sourced image data is obtained at a same time that the image data is obtained.

4. The method of claim 1, wherein the externally-sourced image data is obtained by:
generating a mosaic view of the obstructed area using data obtained from a plurality of remote image sources having partially overlapping views of the physical setting; and
selecting a subset of the mosaic view that corresponds to a vantage point of the electronic device.

5. The method of claim 1, wherein the second image sensor is one of a plurality of remote image sources, and wherein the externally-sourced image data is obtained by:
constructing a three-dimensional model of the obstructed area using data obtained from the plurality of remote image sources that each have at least a partially unobstructed view of the obstructed area; and
generating a device vantage point view of the obstructed area using the three-dimensional model.

6. The method of claim 1 further comprising:
detecting a subsequent interaction with the input device indicative of a subsequent request to present an expanded view of the obstructed area; and
in accordance with detecting the subsequent interaction:
obtaining externally-sourced image data from a third image sensor, wherein at least a portion of the externally-sourced image data comprises an unobstructed view of the obstructed area;
forming third content representing the expanded view of the obstructed area by applying a further enrichment effect to the externally-sourced image data from the third image sensor; and
presenting, on the display, the third content representing the expanded view of the obstructed area.

7. A method comprising:
at an electronic device with a display, an input device, and a first image sensor:
present, on the display, first content representing a standard view of a physical setting depicted in image data generated by the first image sensor;
while presenting the first content, detect an interaction with the input device indicative of a request to present an enriched view of the physical setting; and
in accordance with detecting the interaction:
identifying an object and an unobstructed area in the physical setting in the standard view, wherein the object is not depicted in a subset of the image data;
obtaining externally-sourced image data from a second image sensor, wherein at least a portion of the externally-sourced image data comprises an unobstructed view of the object;
forming second content representing the enriched view of the physical setting by applying an enrichment effect, wherein the enrichment effect:
alters or supplements the subset of the image data generated by the first image sensor with the externally-sourced image data based on the object, and
alters or supplements the subset of the image data associated with the unobstructed area with visibility reduction content, wherein applying the enrichment effect to the subset of the image data associated with the unobstructed area with the visibility reduction content comprises overlaying a region of the display surrounding the obstructed area with the visibility reduction content to form an enhanced focus view of the obstructed area of the physical setting; and
presenting, on the display, the second content representing the enriched view of the physical setting.

8. The method of claim 7, wherein applying the enrichment effect comprises:
identifying an additional subset of the image data that corresponds to the object; and
forming an enriched view of the object by applying the enrichment effect to the additional subset of the image data, wherein forming the enriched view of the object comprises:
forming an expanded view of the object by increasing a quantity of pixels in the display that are occupied by the additional subset of the image data; and
forming the second content representing the enriched view of the physical setting based on the enriched view of the object.

9. The method of claim 8, wherein the expanded view of the object is obtained by oversampling the additional subset of the image data or performing an optical zoom.

10. The method of claim 8, wherein applying the enrichment effect comprises:
forming a compressed view of the physical setting surrounding the object by decreasing a quantity of pixels that are occupied by the image data that is excluded from the additional subset of the image data, wherein the compressed view of the physical setting surrounding the object is obtained by warping the image data that is excluded from the additional subset of the image data.

11. A system comprising:
an electronic device with a display, an input device, and a first image sensor;
at least one processor; and
a computer-readable storage medium comprising instructions that upon execution by the at least one processor cause the system to perform operations, the operations comprising:
presenting, on the display, first content representing a standard view of a physical setting depicted in image data generated by the first image sensor;
while presenting the first content, detecting an interaction with the input device indicative of a request to present an enriched view of a physical setting proximate to the electronic device; and
in accordance with detecting the interaction:
identifying an obstructed area and an unobstructed area of the physical setting in the standard view, wherein the obstructed area is not depicted in a subset of the image data;
obtaining externally-sourced image data from a second image sensor, wherein at least a portion of the externally-sourced image data comprises an unobstructed view of the obstructed area;
forming second content representing the enriched view of the physical setting by applying an enrichment effect, wherein the enrichment effect:
alters or supplements the subset of the image data associated with the obstructed area with the externally-sourced image data, and
alters or supplements the subset of the image data associated with the unobstructed area with visibility reduction content, wherein applying the enrichment effect to the subset of the image data associated with the unobstructed area with the visibility reduction content comprises overlaying a region of the display surrounding the obstructed area with the visibility reduction content to form an enhanced focus view of the obstructed area of the physical setting; and
presenting, on the display, the second content representing the enriched view of the physical setting.

12. The system of claim 11, wherein applying the enrichment effect comprises:
identifying an object in the physical setting;
forming an enriched view of the object by applying the enrichment effect to an additional subset of the image data that corresponds to the object; and
forming the second content representing the enriched view of the physical setting based on the enriched view of the object.

13. The system of claim 12, wherein forming the enriched view of the object comprises:
forming an expanded view of the object by increasing a region of the display that is occupied by the additional subset of the image data.

14. The system of claim 12, wherein applying the enrichment effect comprises:
forming a compressed view of an area of the physical setting that surrounds the object by decreasing a region of the display that is occupied by the image data that is excluded from the additional subset of the image data.

15. The system of claim 11, wherein:
identifying an obstructed area of the physical setting comprises detecting an occlusion object in the physical setting that intervenes between the display and an obstructed area of the physical setting, the occlusion object preventing the obstructed area from being visible in the display; and
applying the enrichment effect comprises overlaying a region of the display corresponding to the occlusion object with the externally-sourced image data that depicts the obstructed area, the externally-sourced image data obtained from a remote image source having an unobstructed view of the obstructed area.

16. The system of claim 11, wherein applying the enrichment effect comprises:
overlaying at least a region of the display with non-visible wavelength image data to present a hyperspectral view of the physical setting.

17. The system of claim 11, wherein applying the enrichment effect comprises:
superimposing virtual image data corresponding to a virtual object over a region that corresponds to an object in the physical setting, wherein the input device is configured to transition between different versions of the virtual object based on movement of the input device.

18. The system of claim 17, wherein the virtual object includes a plurality of layers, and wherein the input device is configured to transition between each of the plurality of layers based on movement of the input device.

19. The system of claim 11, wherein the electronic device is a head-mounted device (HMD) and the input device is a hardware input device disposed on an outward facing surface or an exterior surface of the HMD.

* * * * *